United States Patent [19]

Mori et al.

[11] 4,040,058  
[45] Aug. 2, 1977

[54] DIRECTION FINDER

[75] Inventors: Kenzo Mori, Tokyo; Fumio Kakuchi, Chofu; Kimio Fujii, Tokyo, all of Japan

[73] Assignee: Taiyo Musen Co., Ltd., Tokyo, Japan

[21] Appl. No.: 555,301

[22] Filed: Mar. 4, 1975

[30] Foreign Application Priority Data

Mar. 28, 1974 Japan .............................. 49-34463[U]

[51] Int. Cl.² .............................................. G01S 5/02
[52] U.S. Cl. ............................. 343/113 PT; 343/766; 343/788
[58] Field of Search ............. 343/113 R, 113 PT, 766, 343/788; 334/51

[56] References Cited

U.S. PATENT DOCUMENTS

| | | | |
|---|---|---|---|
| 2,845,622 | 7/1958 | Gamble | 343/113 R |
| 3,020,548 | 2/1962 | Jacobson et al. | 343/113 PT |
| 3,144,626 | 8/1964 | Schwartz | 343/51 |
| 3,323,129 | 5/1967 | Held | 343/113 PT |
| 3,886,559 | 5/1975 | Lanson et al. | 343/766 |

Primary Examiner—Maynard R. Wilbur
Assistant Examiner—T. M. Blum
Attorney, Agent, or Firm—A. W. Breiner

[57] ABSTRACT

An automatic direction finder wherein a loop antenna is fitted within a combined handle and index rotatably pivoted at the center of a direction dial, a gear of a diameter large enough is fixed to said index and a pinion meshing with said gear is connected through a frictional power transmission with a direct current servomotor to which an automatically controlled output of said antenna obtained from the output of said antenna is given.

2 Claims, 4 Drawing Figures

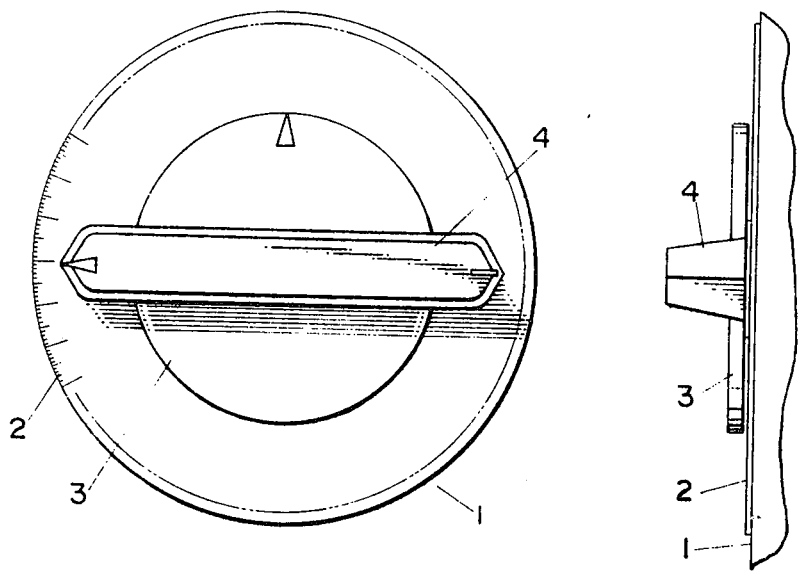
FIG. 1
FIG. 2
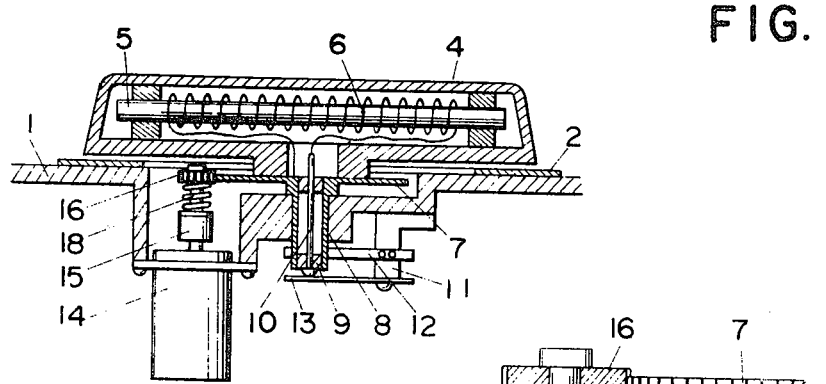
FIG. 3
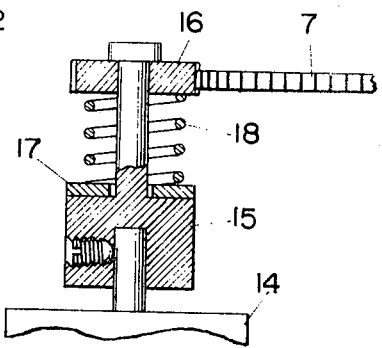
FIG. 4

DIRECTION FINDER

This invention relates particularly to a loop antenna driving mechanism adapted for a small portable automatic direction finder having a dry cell as a current source.

Such portable automatic direction finder is desired to be able to measure the direction by being switched over to a manual operation in order to save the consumption of the electric power in driving the servo-motor or to confirm the direction with the deflection of a meter or with an auditory sense. However, as not only the switchover of the electric circuit but also the mechanical switchover of the antenna driving mechanism is required for such purpose, the structure is complicated and the operation is troublesome.

An object of the present invention is to provide an automatic direction finder made to be able to be used by a manual operation without requiring a mechanical switchover by eliminating the above described difficulties.

FIG. 1 is a plan view of a direction finder embodying the present invention.

FIG. 2 is a side view of the embodiment in FIG. 1.

FIG. 3 is a vertically sectioned view of the same.

FIG. 4 is a magnified view of a part of FIG. 3.

In the drawings which are of an embodiment of the present invention, an azimuth card 2 is fixed to the upper surface of a case 1 of a portable automatic direction finder having a dry cell as a current source and a combined rectangular handle and hollow index 4 fitted to a disk 3 is rotatably fitted to the center of the dial 2. That is to say, a loop antenna 6 wound on a dust core 5 is contained within the above mentioned index 4, a gear 7 having a diameter large enough is fixed to the lower surface of the index 4, a tubular shaft 8 connected to the gear 7 is borne in the case 1 and the antenna 6 is connected at both ends to a conductor rod 10 fitted at the center of the shaft 8 through insulators 9 and to the gear 7. A terminal base 11 of an insulator is fixed to the inside surface of the case 1 and contact springs 12 and 13 fitted to the terminal base are pressed respectively against the side surface of the shaft 8 and the tip of the conductor rod 10 so that, even in case the index 4 is rotated, the output of the loop antenna may be taken out of the above mentioned contact springs 12 and 13. A direct current servomotor 14 is fitted to the side of the shaft 8 on the inside surface of the case 1, a pinion 16 is rotatably fitted to a relay shaft 15 connected with the shaft of the servomotor as in FIG. 4 and a spring 18 is stretched between a seat plate 17 fitted to a stepped part of the relay shaft 15 and the above mentioned pinion 16 so that the relay shaft 15 and pinion 16 may be connected with each other through a frictional power transmission based on the resiliency of the above mentioned spring 18. This pinion 16 is meshed with the above mentioned gear 7. By the way, the output of the above mentioned loop antenna 6 or other sense antenna is combined with an output obtained by balanced modulating the input of the sense antenna or loop antenna with a low frequency signal in the receiving circuit and an automatically controlled output obtained by phase-detecting the resultant signal is given to the above mentioned direct current servomotor 14.

As the automatically controlled output of the loop antenna 6 obtained from the output of said antenna is given to the servomotor 14 as described above, when the index 4 indicates a direction in which no electric wave comes, the above mentioned motor will rotate and the rotation will be transmitted to the pinion 16 through the above mentioned frictional power transmitting mechanism. Therefore, the gear 7 meshed with the pinion 16 will be driven and will be stopped in a position in which the index indicates the direction in which the electric wave comes by the servo-mechanism. In such case, as the gear 7 is large enough and the pinion 16 is small, the load torque applied to the gear 7 will be so small that the above mentioned frictional power transmitting mechanism will operate without slipping.

Further, when the balanced modulating circuit is broken to interrupt the sense antenna input, and the servomotor driving circuit is broken to seitch the operation over to a manual operation and the combined handle and index 4 is rotated by hand to adjust it so that the sound of the speaker may vanish, the direction in which the electric wave comes will be able to be known. In such case, as the driving gear 7 is large enough, the pinion 16 is meshed with it and the servomotor 14 is generally provided with a gear mechanism within it, a large torque will be required in order to mechanically rotate the combined handle and index from outside. Therefore, the frictional power transmitting mechanism between the pinion 16 and relay shaft 15 is slipped so that the combined handle and index 4 may be freely rotatable. Further, even in the above described automatically measuring state, the combined handle and index 4 can be forcibly rotated. Therefore, when the index which has once arrived at an equilibrium is rotated by hand to be released, and automatically controlling operation will be again made so that the index may be stabilized. Therefore, by this operation, whether the indicated direction in such case as of the weak electric industry is correct or not can be confirmed.

As described above, in the automatic direction finder of the present invention, the direction can be measured by a manual operation by directly rotating by hand the index in which the loop antenna is incorporated without requiring a mechanical switchover of the power transmitting mechanism. Therefore, it is simple in the structure, is easy to operate and is very effective particularly as a portable automatic direction finder having a dry cell as a current source.

What is claimed is;

1. In an automatic direction finder which comprises a combined handle and index rotatably pivoted at the center of a direction dial provided above a case, a loop antenna means contained within said index, a gear of a sufficiently large diameter fixed to said index, a direct current servomotor provided on the inside surface of said case so that an automatically controlled output of said antenna means obtained from the output of said antenna means may be given to it and a pinion connected with said direct current servomotor and meshed with said gear of the large diameter, said automatic direction finder characterized by that a frictional power transmitting means composed of said pinion, a spring, a seat plate, and a relay shaft is provided between said direct current servomotor and said gear of the large diameter, whereby said automatic direction finder can be manually operated.

2. A direction finder according to claim 1 wherein a rectangular handle and a loop antenna contained within said index is manually rotated moreover by slipping said frictional power transmitting means.

* * * * *